United States Patent
Hong et al.

(10) Patent No.: US 10,753,501 B2
(45) Date of Patent: Aug. 25, 2020

(54) OUTLET DEVICE WITH ELECTRONIC OUTLET AND MECHANICAL OUTLET TWO MODES

(71) Applicant: XIAMEN SOLEX HIGH-TECH INDUSTRIES CO., LTD., Xiamen, Fujian (CN)

(72) Inventors: Chunjie Hong, Fujian (CN); Lihong Hu, Fujian (CN); Shanlu Yuan, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 0 days.

(21) Appl. No.: 15/369,836

(22) Filed: Dec. 5, 2016

(65) Prior Publication Data
US 2017/0219115 A1   Aug. 3, 2017

(30) Foreign Application Priority Data
Feb. 3, 2016   (CN) .......................... 2016 1 0075728

(51) Int. Cl.
| | | |
|---|---|---|
| *F16K 31/06* | (2006.01) | |
| *E03C 1/05* | (2006.01) | |
| *E03C 1/04* | (2006.01) | |
| *F16K 31/60* | (2006.01) | |

(52) U.S. Cl.
CPC ........ *F16K 31/0603* (2013.01); *E03C 1/0404* (2013.01); *E03C 1/0408* (2013.01); *E03C 1/0412* (2013.01); *E03C 1/055* (2013.01); *E03C 1/057* (2013.01); *F16K 31/60* (2013.01)

(58) Field of Classification Search
CPC ........ E03C 1/0404; E03C 1/055; E03C 1/057; E03C 1/0412; E03C 1/0408; F16K 31/0603; F16K 19/006
See application file for complete search history.

(56) References Cited

U.S. PATENT DOCUMENTS

| | | | | |
|---|---|---|---|---|
| 6,019,130 | A * | 2/2000 | Rump | E03C 1/057 137/601.01 |
| 2007/0152074 | A1* | 7/2007 | Stowe | E03C 1/055 236/12.1 |
| 2012/0234409 | A1* | 9/2012 | Klicpera | B05B 12/004 137/551 |

(Continued)

FOREIGN PATENT DOCUMENTS

WO   WO 2012123121 A1 *  9/2012 ........... E03C 1/0403

*Primary Examiner* — Michael R Reid
(74) *Attorney, Agent, or Firm* — Cooper Legal Group, LLC

(57) ABSTRACT

An outlet device includes an electronic outlet mode and a mechanical outlet mode. The outlet device has a mechanical outlet control device, an electronic outlet control device and a central control module. The central control module comprises a first outlet passage controlled by the mechanical outlet control device, a second outlet passage controlled by the electronic outlet control device, and a central controller. The first outlet passage includes a sensor and the second outlet passage includes an electromagnetic valve. When the mechanical outlet control device controls the first outlet passage to open, the sensor detects water flowing in the first outlet passage, whether the electromagnetic valve opens or not, the central controller switches the electromagnetic value to a normal closed state.

14 Claims, 3 Drawing Sheets

(56) References Cited

U.S. PATENT DOCUMENTS

2015/0083253 A1* 3/2015 Menolotto ........... B65D 47/248
                                                    137/597
2015/0159765 A1* 6/2015 Wawrla ................. E03C 1/0403
                                                    4/677

* cited by examiner

OUTLET DEVICE WITH ELECTRONIC OUTLET AND MECHANICAL OUTLET TWO MODES

FIELD OF THE INVENTION

The present invention relates to an outlet device, especially to an outlet device that can be automatically closed when the outlet volume reaches a certain value.

BACKGROUND OF THE INVENTION

In modern society, electronic taps, such as infrared sensing taps, are more and more popular in public places. A user can only put the hand below the tap and water will automatically flow out. Traditional electronic taps have only one mode of electronic outlet. Once the electronic system fails, the tap cannot be used. Failure can be avoided if the electronic tap further has a mechanical outlet switch. Moreover, the traditional electronic tap cannot be turned off. When washing the wash basin or the tap, the tap will be always turned on because of the infrared sensing, which causes water wasting.

In addition, baking, cooking, making tea or coffee are necessary in daily life. Especially in western-style baking, there are strict rules to the ingredients and the flow of water. A user usually needs a measuring cup to get the water. It often happens that when the user takes the measuring cup under the tap to get the water, the measuring cup is filled up in one second when in high flow volume, thus far exceeding the needed volume, which may waste the water. When in low flow volume, the water is acquired slowly, and during the process, the user needs to take care of the volume in the cup to turn off the tap, which is a waste of time and labor. To solve the problems, a rationed tap exists in the market. This rationed tap can supply rationed flow volume according to the setting. The tap is turned off after the flow volume reaches the preset value, so that the user need not take care of the volume. However, existing rationed tap water usually has a flow adjusting portion. The user adjusts the proper flow volume and the water flows out. But mis-operation may happen as the user adjusts the flow volume, whereby the user is not ready to get the water but water still flows out of the tap, causing an inaccurate amount of the water volume to be delivered.

SUMMARY OF THE INVENTION

The present invention is provided with an outlet device with an electronic outlet and a mechanical outlet in two modes to solve the main technical problem. The present invention can be freely switched between an electronic outlet mode and a mechanical outlet mode. When the user uses the mechanical outlet mode, the electronic outlet mode is automatically interrupted so as to ensure that the outlet modes do not interfere with each other.

Another technical problem solved by the present invention is that the electronic outlet mode is further designed to be a rationed outlet mode. The rationed volume option and the outlet control are applied with two independent switches, which avoids mis-operation.

To solve above mentioned technical problems, the present invention provides an outlet device with two modes: an electronic outlet mode and a mechanical outlet mode, wherein the outlet device comprises a mechanical outlet control device, an electronic outlet control device and a central control module.

The central control module comprises a first outlet passage controlled by the mechanical outlet control device, a second outlet passage controlled by the electronic outlet control device, and a central controller. The first outlet passage includes a sensor and the second outlet passage includes an electromagnetic valve.

When the mechanical outlet control device controls the first outlet passage to open, the sensor detects water flowing in the first outlet passage, whether the electromagnetic valve opens or not, and the central controller switches the electromagnetic valve to a normal closed state.

The present invention further provides an outlet device with an electronic outlet and a mechanical outlet mode, the outlet device comprising a mechanical outlet control device, an electronic outlet control mode and a central control module.

The central control module comprises a first outlet passage controlled by the mechanical outlet control device, a second outlet passage controlled by the electronic outlet control device and a central controller. The mechanical outlet control device includes a sensor, and the second outlet passage includes an electromagnetic valve. When the mechanical outlet control device controls the first outlet passage to open, the sensor detects a position change of the mechanical outlet control device, whether the electromagnetic valve opens or not, and the central controller switches the electromagnetic valve to a normal closed state.

In another preferred embodiment, the electronic outlet control device includes an electronic outlet control switch and a volume option switch. The second outlet passage further includes a flow meter. One end of the second outlet passage is a cool water inlet, and the other end is an outlet connected to the outlet device.

The volume option switch is linked to an encoder and the encoder includes an unlimited outlet gear and a plurality of rationed outlet gears.

The electronic outlet control switch and the volume option switch are independently disposed, the volume option switch drives the encoder to set in a proper outlet gear, the electronic outlet control switch is operated to make the central controller turn on the electromagnetic valve, and the flow meter starts to count.

In another preferred embodiment, the volume option switch is a rotating ring disposed at one side of the outlet portion of the outlet device, the rotating ring includes a volume dividing ruler, the outlet port of the outlet device includes a marker, and the volume dividing ruler includes a scale corresponding to the unlimited outlet gear and a plurality of scales corresponding to the rationed outlet gear. When the rotating ring rotates to make one of the scales align with the marker, the corresponding outlet gear is selected. In another preferred embodiment, when the volume option switch rotates to one side, the encoder rotates to the unlimited outlet gear. When the volume option switch rotates to the other side, the encoder rotates to one of the rationed outlet gears. In another preferred embodiment, when the encoder rotates to the unlimited outlet gear, the central controller switches the electromagnetic valve to a normal closed state. In another preferred embodiment, the electronic outlet control switch comprises a touch switch. When the encoder is disposed in any rationed outlet gear, touching the touch switch is capable of turning the electromagnetic valve on, the volume meter starts to count, and when the volume reaches the setting value of the rationed outlet gear, the central controller controls to close the outlet valve to turn off.

In another preferred embodiment, the outlet device is a tap or a shower head.

In another preferred embodiment, the sensor is an angle sensor or a displacement sensor. Compared to existing known technology, the technical proposal of the present invention has advantages as follows:

1. The present invention provides an outlet device with an electronic outlet mode and a mechanical outlet mode. The outlet device includes an electronic outlet control device and a mechanical outlet device. Therefore, the outlet device can realize an electronic outlet and a mechanical outlet, and ensures that if there is a failure to the electronic outlet, the mechanical outlet mode can still work. Besides, when the user uses the mechanical outlet mode, the electronic outlet mode is automatically invalid, two functions are independent, and the outlet stability is guaranteed.

2. The present invention provides an outlet device with an electronic outlet mode and a mechanical outlet mode. The electronic outlet mode is a rationed outlet mode. The volume option switch is linked to the encoder, and the encoder includes the unlimited outlet gear and a plurality of rationed outlet gears. Therefore, when the volume option switch is disposed to the corresponding gear, the user can freely switch it between the rationed outlet mode and the unlimited outlet mode. As the volume switch and the volume control are applied with two independent switches, the user needs to turn on the outlet control switch after he chooses the volume. This two-stage operation efficiently avoids mis-operation.

3. The present invention provides an outlet device with an electronic outlet mode and a mechanical outlet mode. The rationed portion is an electronic only device. The encoder sends the volume the user chooses to the central controller, and when the user operates the electronic outlet control switch, the central controller controls to turn on the electromagnetic valve and the volume meter starts to count. When the volume meter counts to the target volume of the current gear, the central controller controls to turn off the electromagnetic valve. This all-electronic control guarantees the accuracy of the volume count.

Moreover, the temperature adjusting function is added to the mechanical outlet mode, and improves the outlet variety of the outlet device. When the user chooses the unlimited outlet gear, the electronic outlet mode is invalid; when the user rotates the handle to achieve the mechanical outlet mode, if the user continues to rotate the handle, the outlet temperature rises, satisfying the needs of the user using the warm water and enriching the user experience.

4. The present invention provides an outlet device with an electronic outlet mode and a mechanic outlet mode. The outlet control switch is applied with a touch switch, and the sensing area is small, requiring the user to accurately touch to trigger outlet, thus avoiding mis-operation.

5. The present invention provides an outlet device with an electronic outlet mode and a mechanic outlet mode, the outlet device can be a tap, a shower head or other normal outlet device, it has wide applicability.

DETAILED DESCRIPTION OF THE EMBODIMENTS

The present invention will be further described with the drawings and the embodiments.

The First Embodiment

Figure 1:
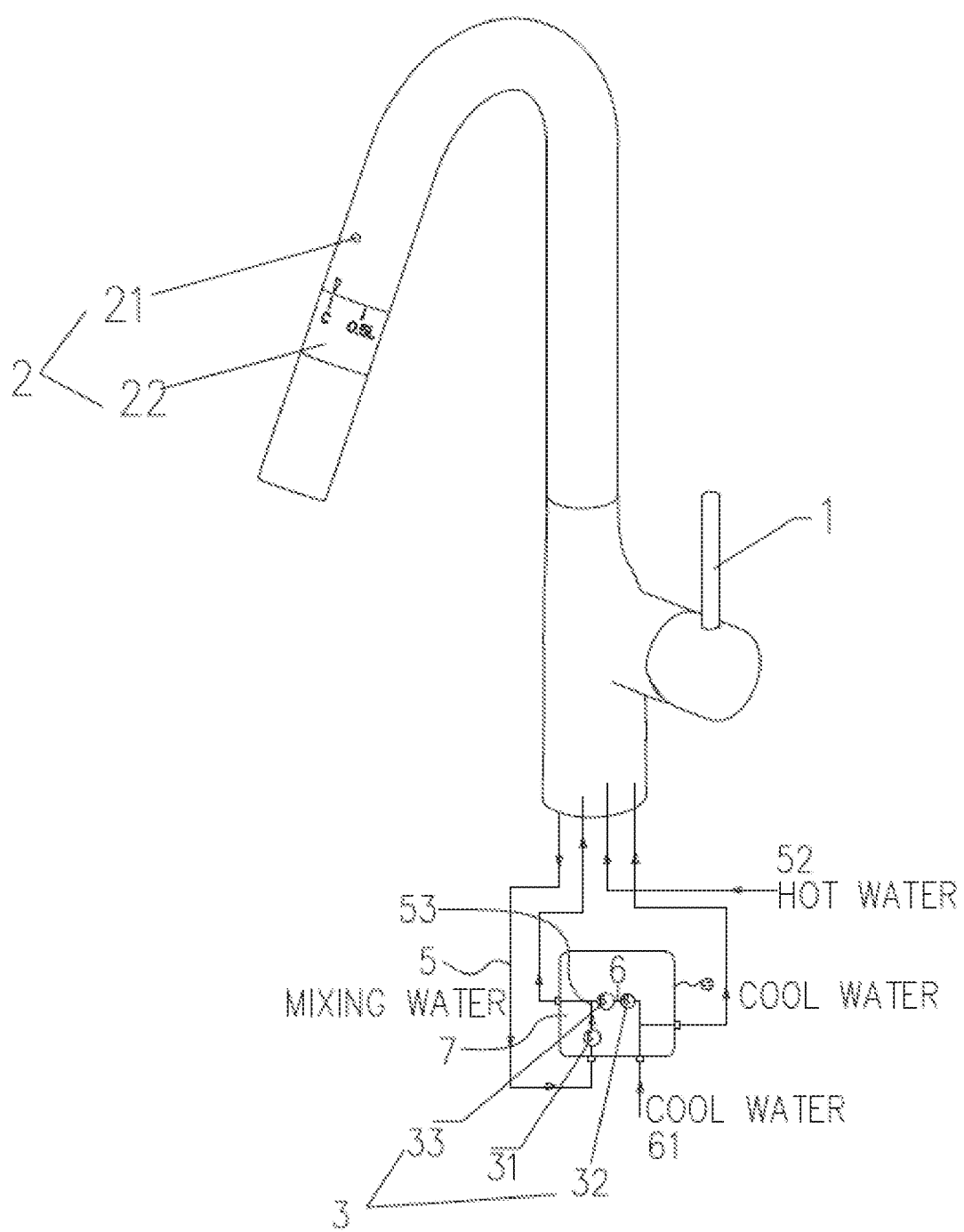
FIG. 1 illustrates a schematic diagram of the waterway of a preferred embodiment of the present invention.
Figure 2:
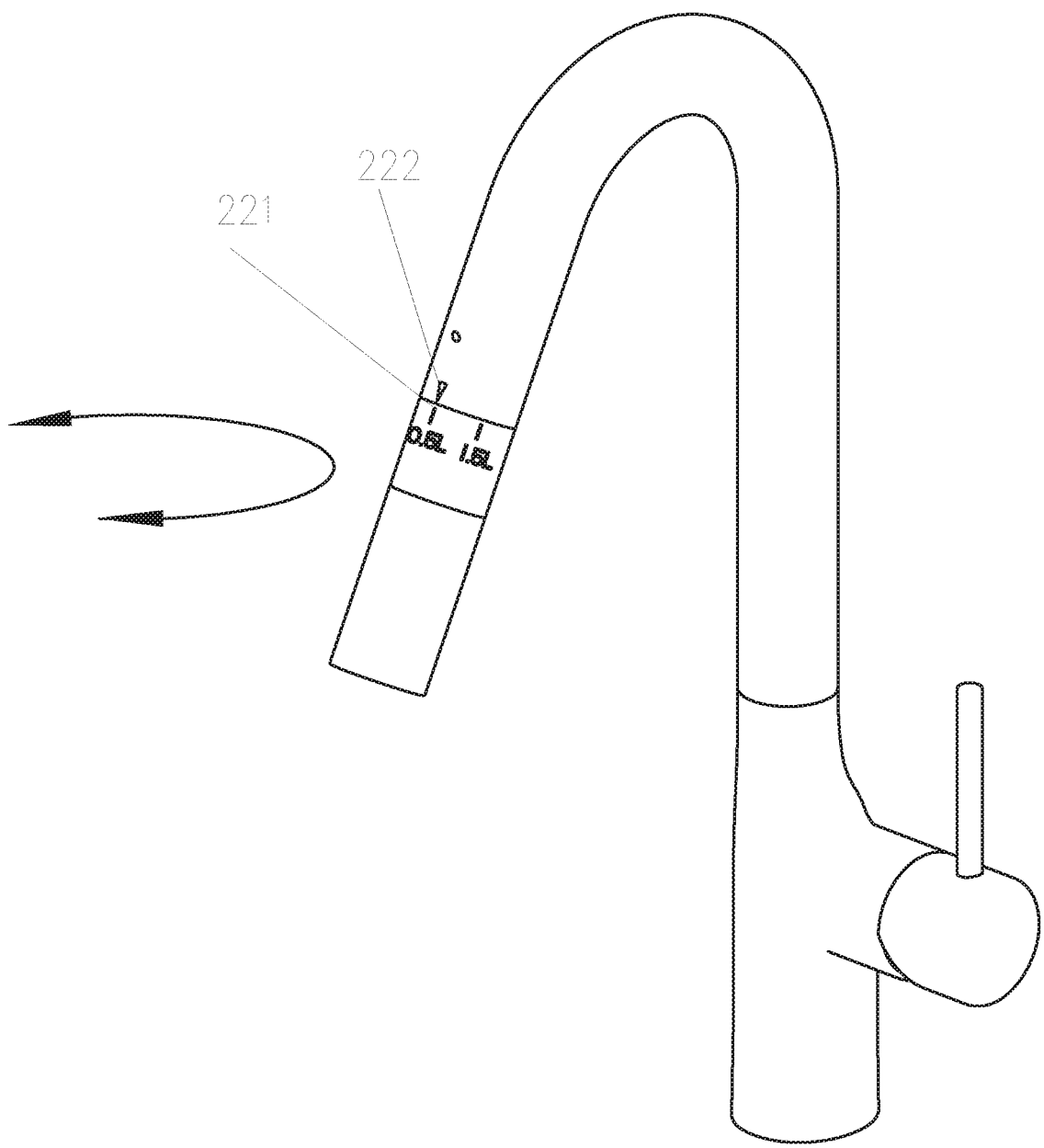
FIG. 2 illustrates a schematic diagram of the preferred embodiment of the present invention in rationed outlet.
Figure 3:
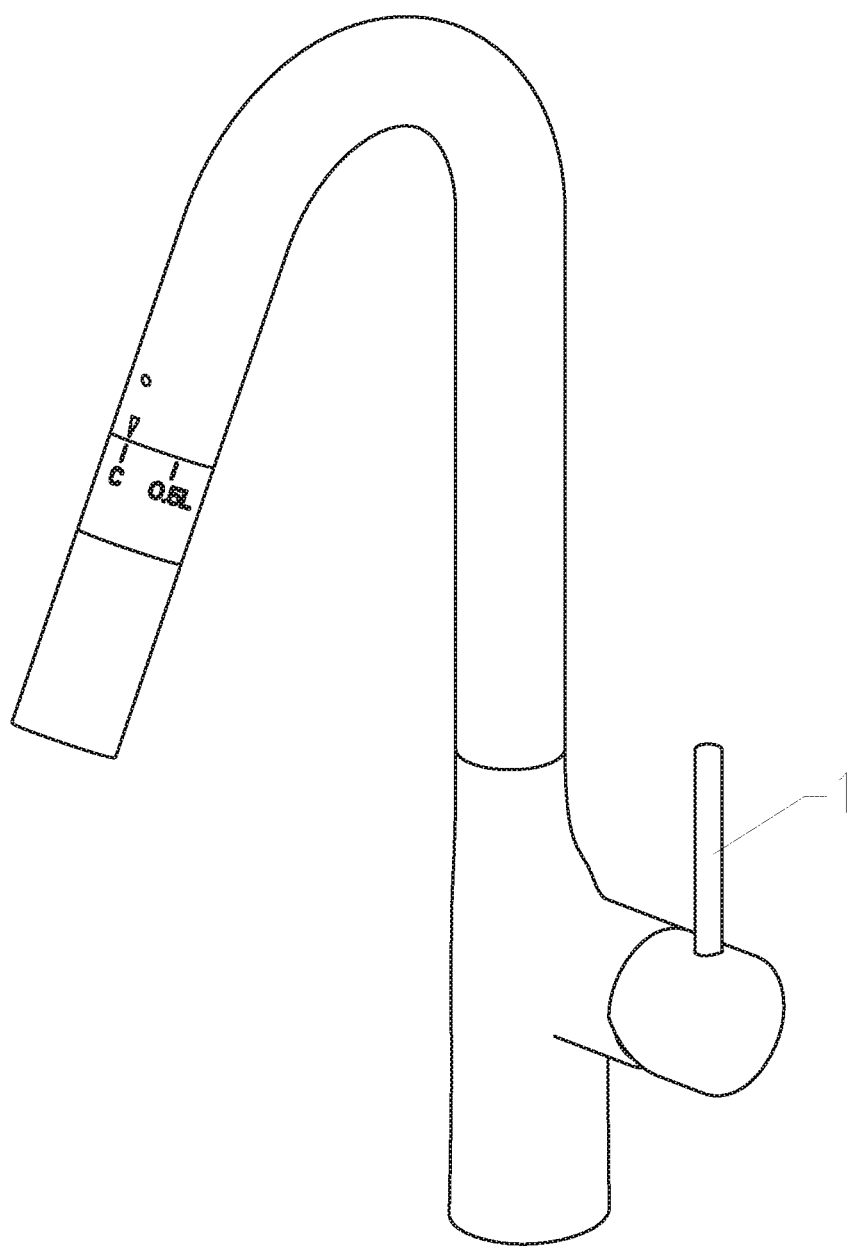
FIG. 3 illustrates a schematic diagram of the preferred embodiment of the present invention in a closed state.

Referring to FIGS. 1-3, a kitchen tap with an electronic outlet mode and a mechanical outlet mode comprises a mechanical outlet control device 1, an electronic outlet control device 2, and a central control module 3.

The central control module 3 comprises a first outlet passage 5 controlled by the mechanical outlet control device 1, a second outlet passage 6 controlled by the electronic outlet control device 2, and a central controller 7 that includes a sensor 31. The second outlet passage 6 includes an electromagnetic valve 32. FIG. 1 further shows a hot water inlet 52, a mixing water outlet 53 and a cool water inlet 61.

When the mechanical outlet control device controls to turn on the first outlet passage, the sensor detects water flowing in the first outlet passage, whether the electromagnetic valve 32 opens or not, and the central controller switches the electromagnetic valve 32 to a normal closed state immediately. So that the mechanical outlet is prior to the electronic outlet, the two outlet modes are independent and do not interfere with each other. And with the mechanical outlet, even if the electronic outlet fails, the kitchen tap can be still normally used.

In this embodiment, the electronic outlet control device 2 is provided with rationed outlet function. In detail, the embodiment comprises an electronic outlet control switch 21 and a volume option switch 22. The second outlet passage further includes a volume meter (also, "flow meter") 33. One end of the second outlet passage 6 is connected to a cool water inlet 61 and the other end is connected to the outlet of the kitchen tap.

The volume option switch 22 is linked to the encoder. The encoder includes an unlimited outlet gear and a plurality of rationed outlet gears.

The electronic outlet control switch 21 and the volume option switch are independent. When the volume option switch 22 drives the encoder to a proper outlet gear, operating the electronic outlet control switch 21 can make the central controller turn on the electromagnetic valve 32. The volume meter 33 starts to count, and when the volume meter 33 counts to the target volume set by the encoder, the central controller turns off the electromagnetic valve 32, thus achieving rationed outlet.

In this embodiment, the volume option switch is a rotating ring 22 disposed at one side of the outlet portion of the kitchen tap. The rotating ring 22 includes a volume dividing ruler 221 and the outlet portion of the kitchen tap includes a marker 222. The volume dividing ruler 221 includes a scale C corresponding to the unlimited outlet gear and scales 0.5 L, 1 L, 1.5 L, corresponding to the rationed outlet gears. When the rotating ring 22 rotates to make the scale of the volume dividing ruler align with the marker, the rotating ring 22 indicates the present outlet flow volume.

Furthermore, when the rotating ring 22 rotates to one side, the encoder rotates to the unlimited outlet gear. When the rotating ring 22 rotates to the other side, the encoder rotates to one of the rationed outlet gears. By different rotating directions, the user can choose the unlimited outlet gear or the rationed outlet gear easily, and the user experience is better.

If the mechanical outlet control device 1 is closed and the user turns on the electronic outlet control switch 21 by accident, water will flow out of the kitchen tap, that is to say, when the mechanical outlet control device 1 is closed, the electronic outlet control device 2 is always available. This situation is not suitable because mis-operation easily happens when the user is washing the kitchen tap. To solve the problem, this embodiment further provides that: when the encoder is rotated to the unlimited outlet gear, the central controller switches the electromagnetic valve 32 to a normal closed state. Therefore, the user just needs to rotate the rotating ring 22 to the unlimited outlet gear to turn off the electronic outlet mode, so that the kitchen tap will turn to a mechanical traditional tap, and the tap will not turn on when washing the tap or the washbasin.

In this embodiment, the electronic outlet control switch 21 is a touch switch, press switch or infrared switch. Simple substitutions are available and will not be further described.

As a traditional kitchen tap has a cool water outlet mode and a hot water outlet mode, for these in this embodiment, the first outlet passage comprises a cool water inlet 61, a hot water inlet 52 and a mixing water outlet 53. The mixing water outlet is connected to the second outlet passage and the sensor 31 is disposed at the end of the mixing water outlet of the first outlet passage.

Correspondingly, the mechanical outlet control device 1 comprises a handle. When the handle is rotated, the first outlet passage is open, and when the handle is continuously rotated, the proportion of cool water of the first outlet passage decreases and the proportion of hot water increases to make the outlet temperature of the outlet device rise.

The working process of the kitchen tap is as follows:

1. The mechanical outlet control mode: when the handle is rotated, the first outlet passage is open and the water inside is cool water. When the handle is continuously rotated, the flowing area of the cool water inlet is decreased and the flowing area of the hot water inlet is increased, forming mixed water in the first outlet passage. The outlet temperature of the kitchen tap rises with the rotating of the handle. When the sensor 31 detects water flowing in the first outlet passage, the electromagnetic valve 32 is always turned off; however, if the user adjusts the rotating ring 22 or touches the touch switch, the electronic outlet mode is not triggered. This guarantees the highest priority of the mechanical outlet mode, and the outlet mode is single and stable.

2. The electronic outlet control mode: with the handle is in a closed state, the sensor 31 detects no water flowing in the first outlet passage. When the user rotates the rotating ring 22, the encoder is driven to the proper outlet gear, touching the touch switch makes the central controller turn on the electromagnetic valve, and the volume meter 33 starts to count. When the volume meter 33 counts to the target volume set by the encoder, the central controller turns off the electromagnetic valve 32 to achieve rationed outlet.

3. Close mode: when the user rotates the rotating ring 22 to unlimited outlet mode, the electronic outlet control mode is turned off. If the mechanical outlet control device is turned off, no water flows out of the kitchen tap.

It should be noted that this embodiment rations tap water, for example. Other electronic-mechanical double-switch taps are available to apply with the above control idea, and are within the scope of the present invention.

The Second Embodiment

This embodiment is different from the first embodiment in that: it is applied in a shower head but not a kitchen tap. The principle and the basic structure are similar, it is only needed to design the shower head structure.

The Third Embodiment

This embodiment is different from the first embodiment in that: the handle includes an angle sensor or a displacement sensor. When the user lifts or rotates the handle, the angle sensor or the displace sensor can detect that the first outlet passage is turned on, so that the central controller controls the electromagnetic valve to be in a normal closed state. The rest of this embodiment is similar to the first embodiment.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. An outlet device with an electronic outlet mode and a mechanical outlet mode, comprising:
    a mechanical outlet control device comprising a handle;
    an electronic outlet control device;
    a central controller;
    a first outlet passage controlled by the handle and coupled to a sensor; and
    a second outlet passage controlled by the electronic outlet control device and comprising an electromagnetic valve;
    wherein:
        the mechanical outlet control device is configured to control the first outlet passage to open;
        the sensor is configured to detect water flowing in the first outlet passage;
        the central controller is configured to, in response to the sensor detecting the water flowing in the first outlet passage, switch the electromagnetic valve to a normal closed state whether or not the electromagnetic valve is open;
        the electronic outlet control device comprises an electronic outlet control switch and a volume option switch;
        the second outlet passage further comprises a flow meter;
        a first end of the second outlet passage is an outlet connected to the outlet device;
        the electronic outlet control switch and the volume option switch are independently disposed;
        the volume option switch is linked to an encoder;
        the flow meter is configured to start to count in response to operation by the electronic outlet control switch to turn on the electromagnetic valve;
        the volume option switch is a rotating ring disposed at one side of an outlet portion of the outlet device;
        the rotating ring comprises a volume dividing ruler;
        the outlet portion of the outlet device comprises a marker;
        the central controller is linked to the encoder, and the encoder has a plurality of rationed outlet gear positions;
        the volume dividing ruler comprises scales respectively corresponding to the rationed outlet gear positions; and
        the central controller is linked to the flow meter and the electromagnetic valve.

2. The outlet device with the electronic outlet mode and the mechanical outlet mode according to claim 1, wherein:
rotation of the rotating ring to one side selects an unlimited outlet gear position; and
rotation of the rotating ring to another side selects one of the rationed outlet gear positions.

3. The outlet device with the electronic outlet mode and the mechanical outlet mode according to claim 2, wherein the outlet device is further configured to, in response to selection of the unlimited outlet gear position, switch the electromagnetic valve to the normal closed state.

4. The outlet device with the electronic outlet mode and the mechanical outlet mode according to claim 1, wherein:
the electronic outlet control switch comprises a touch switch configured to open the electromagnetic valve in response to a touch; and
the outlet device is further configured to, in response to a water volume reaching a setting value of a selected rationed outlet gear position of the rationed outlet gear positions, close the electromagnetic valve.

5. The outlet device with the electronic outlet mode and the mechanical outlet mode according to claim 1, wherein:
a mixing water outlet of the first outlet passage is connected to the second outlet passage; and
the sensor is disposed at an end of the first outlet passage.

6. The outlet device with the electronic outlet mode and the mechanical outlet mode according to claim 1, wherein:
the outlet device is further configured to, in response to continuous rotation of the handle, decrease a proportion of cool water in the first outlet passage and increase a proportion of hot water in the first outlet passage.

7. The outlet device with the electronic outlet mode and the mechanical outlet mode according to claim 1, wherein the outlet device is a tap or a shower head.

8. The outlet device with the electronic outlet mode and the mechanical outlet mode according to claim 1, wherein the sensor is an angle sensor or a displacement sensor.

9. The outlet device with the electronic outlet mode and the mechanical outlet mode according to claim 1, wherein:
a second end of the second outlet passage is a cool water inlet;
the encoder further comprises an unlimited outlet gear position;
the volume option switch drives the encoder to be set in one of the rationed outlet gear positions or in the unlimited outlet gear position; and
the electronic outlet control switch is operated to make the central controller turn on the electromagnetic valve.

10. The outlet device with the electronic outlet mode and the mechanical outlet mode according to claim 9, wherein:
the volume dividing ruler further comprises a scale corresponding to the unlimited outlet gear position; and
when the rotating ring rotates, causing one of the scales to align with the marker, a corresponding unlimited outlet gear position or rationed outlet gear position is selected.

11. The outlet device with the electronic outlet mode and the mechanical outlet mode according to claim 1, wherein:
the electronic outlet control switch comprises a touch switch;
when any one of the rationed outlet gear positions is selected, the touch switch is configured to turn on the electromagnetic valve in response to a touch and the flow meter starts to count; and
when a water volume reaches a setting value of a selected rationed outlet gear position of the rationed outlet gear positions, the central controller is configured to close the electromagnetic valve.

12. The outlet device with the electronic outlet mode and the mechanical outlet mode according to claim 11, wherein:
the first outlet passage is connected to a cool water inlet, a hot water inlet and a mixing water outlet;
the mixing water outlet is connected to the second outlet passage; and
the sensor is disposed at an end of the first outlet passage.

13. The outlet device with the electronic outlet mode and the mechanical outlet mode according to claim 12, wherein:
the outlet device is further configured to, in response to continuous rotation of the handle, decrease a proportion of cool water in the first outlet passage and increase a proportion of hot water in the first outlet passage.

14. The outlet device with the electronic outlet mode and the mechanical outlet mode according to claim 1, wherein:
the first outlet passage is connected to a cool water inlet, a hot water inlet and a mixing water outlet;
an inlet of the second outlet passage is connected to only cool water;
the mixing water outlet is connected to the second outlet passage; and
the sensor is disposed at an end of the first outlet passage.

* * * * *